(12) United States Patent
Chen et al.

(10) Patent No.: US 7,382,608 B2
(45) Date of Patent: Jun. 3, 2008

(54) RETAINING DEVICE FOR ASSEMBLING DRIVE BRACKET

(75) Inventors: Yun-Lung Chen, Tu-cheng (TW); Jun Tang, Shenzhen (CN); Zhou Xu, Shenzhen (CN); Shao-Bin Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 343 days.

(21) Appl. No.: 11/015,718

(22) Filed: Dec. 17, 2004

(65) Prior Publication Data

US 2005/0276012 A1   Dec. 15, 2005

(30) Foreign Application Priority Data

Jun. 9, 2004   (CN) .................. 2004 2 0083974

(51) Int. Cl.
*H05K 5/00* (2006.01)
*G11B 33/02* (2006.01)

(52) U.S. Cl. .................. 361/685; 361/727; 360/97.01; 369/75.11; 312/223.1; 312/223.2

(58) Field of Classification Search ................ 361/685, 361/725–727; 360/97.01; 369/75.1; 312/223.1, 312/223.2
See application file for complete search history.

(56) References Cited

U.S. PATENT DOCUMENTS

| | | | |
|---|---|---|---|
| 5,349,483 A | 9/1994 | Tsai | |
| 6,249,431 B1 * | 6/2001 | Chan | 361/685 |
| 6,781,841 B2 * | 8/2004 | Kim et al. | 361/724 |
| 6,781,842 B2 * | 8/2004 | Chen et al. | 361/725 |
| 6,826,044 B2 * | 11/2004 | Gan et al. | 361/685 |
| 2002/0190187 A1 * | 12/2002 | Yuan | 248/694 |
| 2003/0210520 A1 * | 11/2003 | Chien et al. | 31/685 |
| 2004/0079655 A1 * | 4/2004 | Hsieh et al. | 206/307 |
| 2005/0243507 A1 * | 11/2005 | Lambert et al. | 361/685 |
| 2006/0061956 A1 * | 3/2006 | Chen et al. | 361/685 |

* cited by examiner

*Primary Examiner*—Jayprakash Gandhi
*Assistant Examiner*—Zachary M Pape
(74) *Attorney, Agent, or Firm*—Wei Te Chung

(57) ABSTRACT

A retaining device includes a computer cage (30), a drive bracket (20) for receiving a storage device, a displacing assembly (40) movably combining the drive bracket and the computer cage together. The displacing assembly includes a first fixing member (42) slidably attached to the bottom of the drive bracket, a second fixing member (44) secured in the computer cage, and a pair of connecting members (46) pivotably disposed between the first fixing member and the second fixing member. The connecting member comprises a first post (462), and a second post (464) parallel to the first post. The first and second fixing member each define a corresponding semicircular slot (424,442) to engagingly receiving the posts. The drive bracket is moved in and out form the computer cage, with the first and second posts of the connecting member pivotally engaging in the semicircular slots of the first and the second fixing member.

18 Claims, 8 Drawing Sheets

US 7,382,608 B2

RETAINING DEVICE FOR ASSEMBLING DRIVE BRACKET

BACKGROUND OF THE INVENTION

1. Field of the Invention

The present invention relates to retaining devices for assembling drive bracket, and more particularly to a retaining device which facilitates attachment of a storage device to a computer cage.

2. Description of the Related Art

Computers have been widely used in modern life. It is desirable for a user or technician to conveniently access internal devices such as storage devices, expansion cards and motherboard for purpose of service. However, storage devices, such as hard disk drives, compact disk read-only memory (CD-ROM) drives, digital video disc (DVD) drives, floppy disk drives, and the like are typically secured in computer chassis with screws or bolts. It is complicated and time-consuming to manipulate screws.

As disclosed in U.S. Pat. No. 5,349,483, a hard disk drive is firstly attached to a sliding box with screws, and the sliding box is inserted in a chamber attached on a computer chassis and releasably locked in a place through tenon-and-mortise joints. It is boring to manipulate screws to detach the hard disk drive from the box when in need.

Taiwan Patent Publication No. 482307 teaches another hard disk drive mounting device. A mounting device included a support bracket, and a securing plate. The hard disk drive is fixed to the support bracket with screws. The support bracket has a body with spring fingers for engaging computer chassis, and the securing plate has a base for engaging with the body of the support bracket. The securing plate includes a spring portion extending from one edge of the base for engaging the computer chassis, and a pulling portion with a slot defined therein extending from the opposite edge of the base. In spite of unduly complicated fixing structure, it is desired to reduce the use of screws.

An improved retaining device for assembling drive bracket which overcomes the above-mentioned problems is desired.

SUMMARY OF THE INVENTION

Accordingly, an object of the present invention is to provide a retaining device which facilitates the attachment of a storage device to a computer cage.

To achieve the above object, a retaining device in accordance with the present invention comprises a computer cage, a drive bracket for receiving a storage device, a displacing assembly movably combining the drive bracket and the computer cage together. The displacing assembly comprises a first fixing member slidably attached to the bottom of the drive bracket, a second fixing member secured in the computer cage, and a pair of connecting members pivotably disposed between the first fixing member and the second fixing member. The connecting member comprises a first post, and a second post parallel to the first post. The first and second fixing member defines corresponding semicircular slots to engagingly receiving the posts. The drive bracket is moved in and out the computer cage, with the first and second posts of the connecting member pivotally engaging in the semicircular slots of the first and the second fixing member.

Other objects, advantages and novel features of the present invention will be drawn from the following detailed description of preferred embodiments of the present invention with the attached drawings, in which:

DETAILED DESCRIPTION OF THE PRESENT INVENTION

Figure 1:
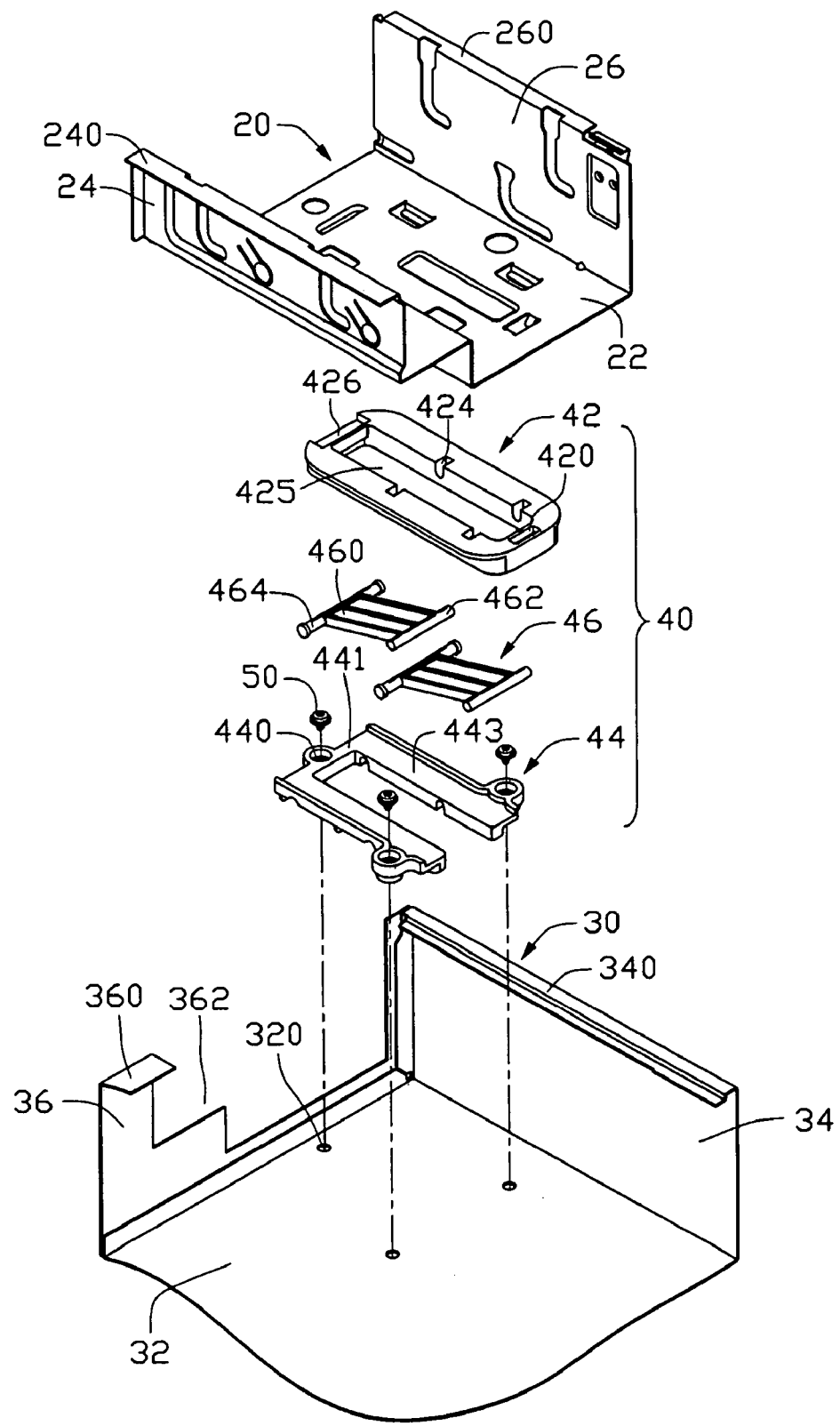
FIG. 1 is an exploded, isometric view of a retaining device in accordance with a preferred embodiment of the present invention, the retaining device comprising a computer cage, a drive bracket, and a displacing assembly.

Referring to FIG. 1, a retaining device in accordance with the preferred embodiment of the present invention is provided for holding a storage device (not shown) in a cage 30 of an electronic device like a computer. The retaining device comprises a drive bracket 20, a displacing assembly 40, and a computer cage 30. The drive bracket 20 is for receiving the storage device and movably attached to the computer cage 30 via the displacing assembly 40.

The computer cage 30 comprises a bottom wall 32, a sidewall 34 and a front wall 36 perpendicularly extended from adjacent edges the bottom wall 32. A plurality of fixing holes 320 is defined in the bottom wall 32. An entrance 360 is defined in the front wall 36. An inward supporting tab 360 extends perpendicularly from the front wall 36 adjacent an outer side of the opening 362. A first supporting flange 340 extends inwardly from a top extremity of the sidewall 34.

Figure 2:
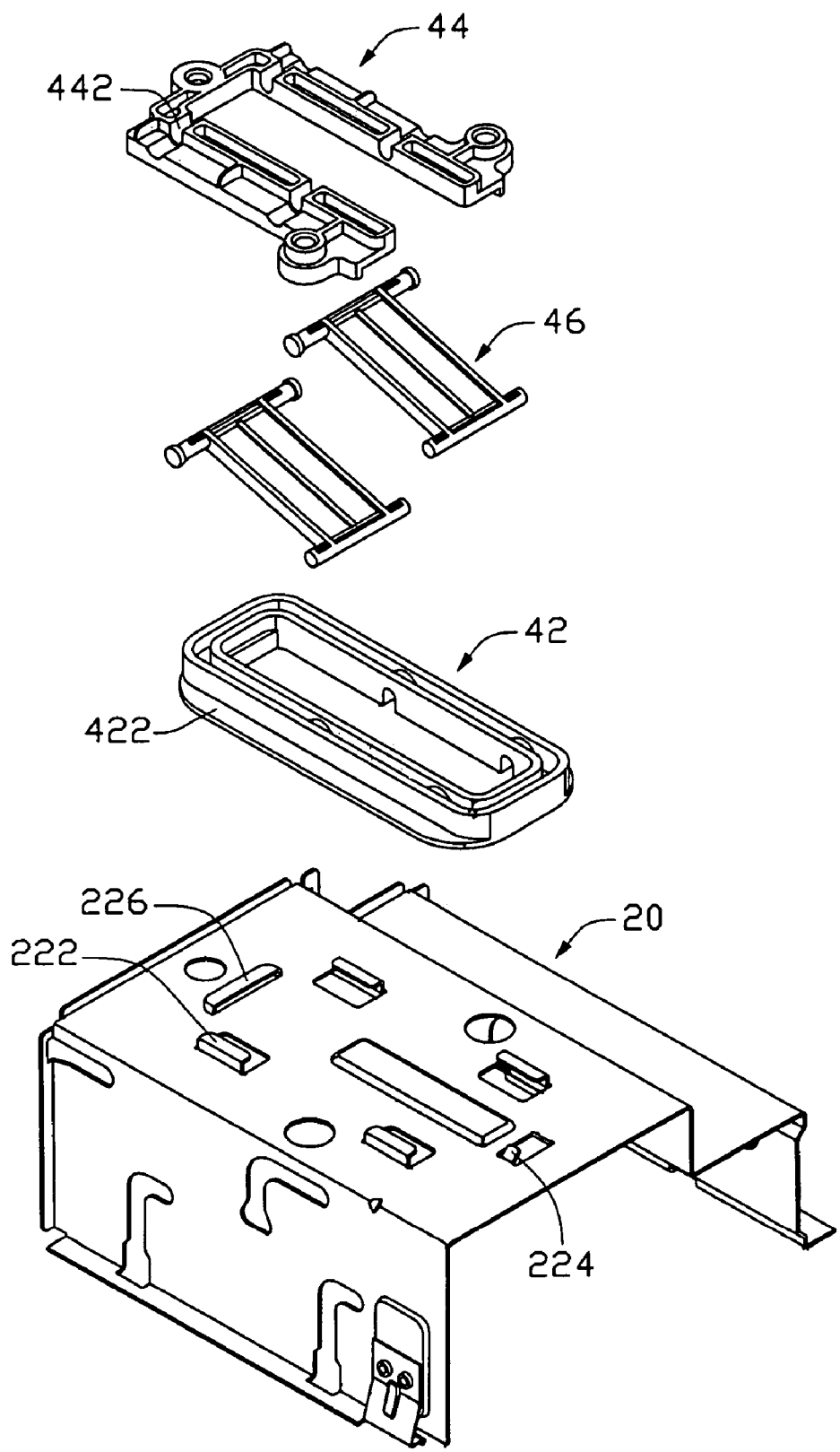
FIG. 2 is an enlarged view of the drive bracket, and the displacing assembly shown in FIG. 1, but showing these components inverted from FIG. 1.
Figure 3:
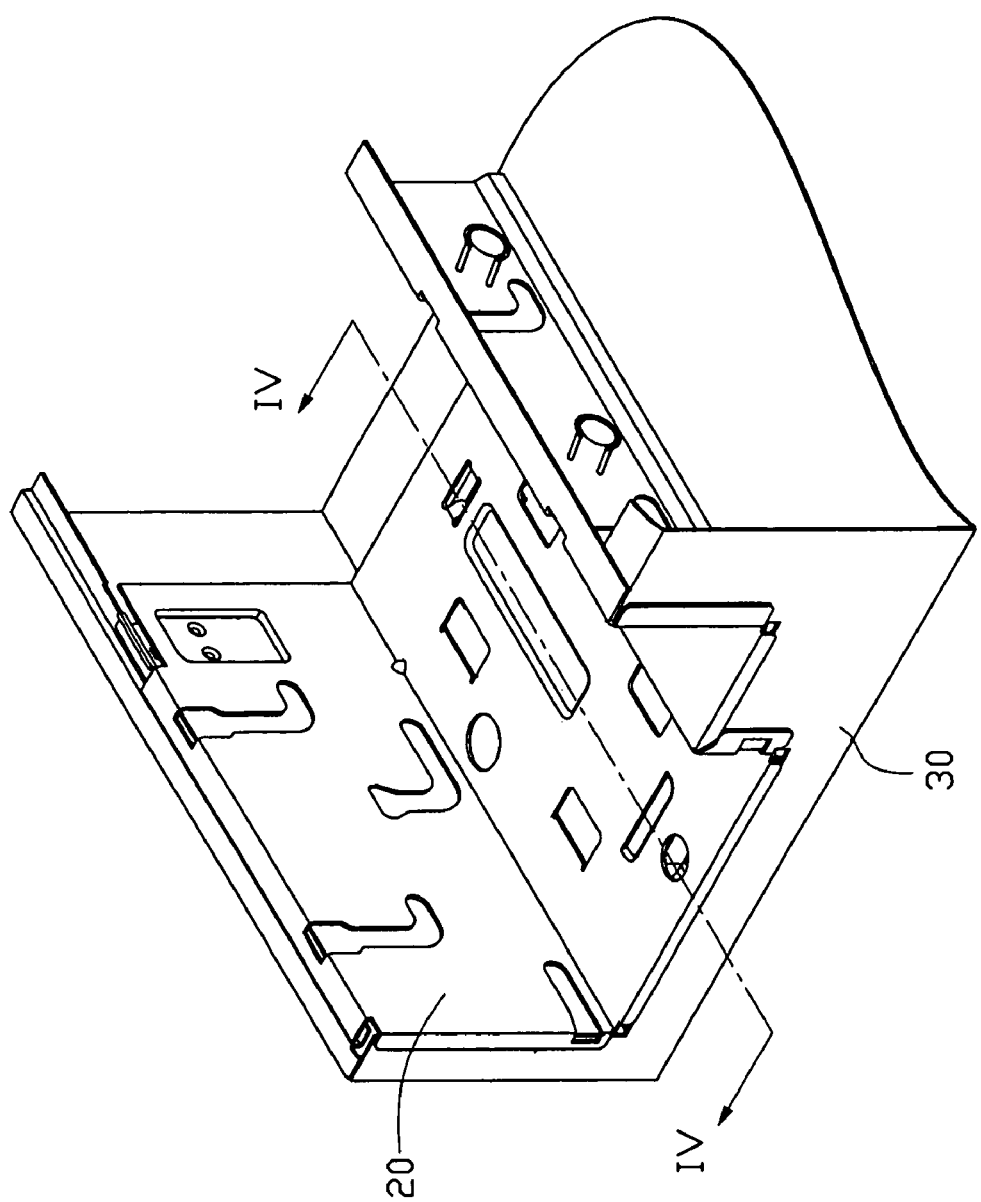
FIG. 3 is an assembled view of FIG. 1, showing the drive bracket in a first orientation, but viewed from another aspect.
Figure 4:
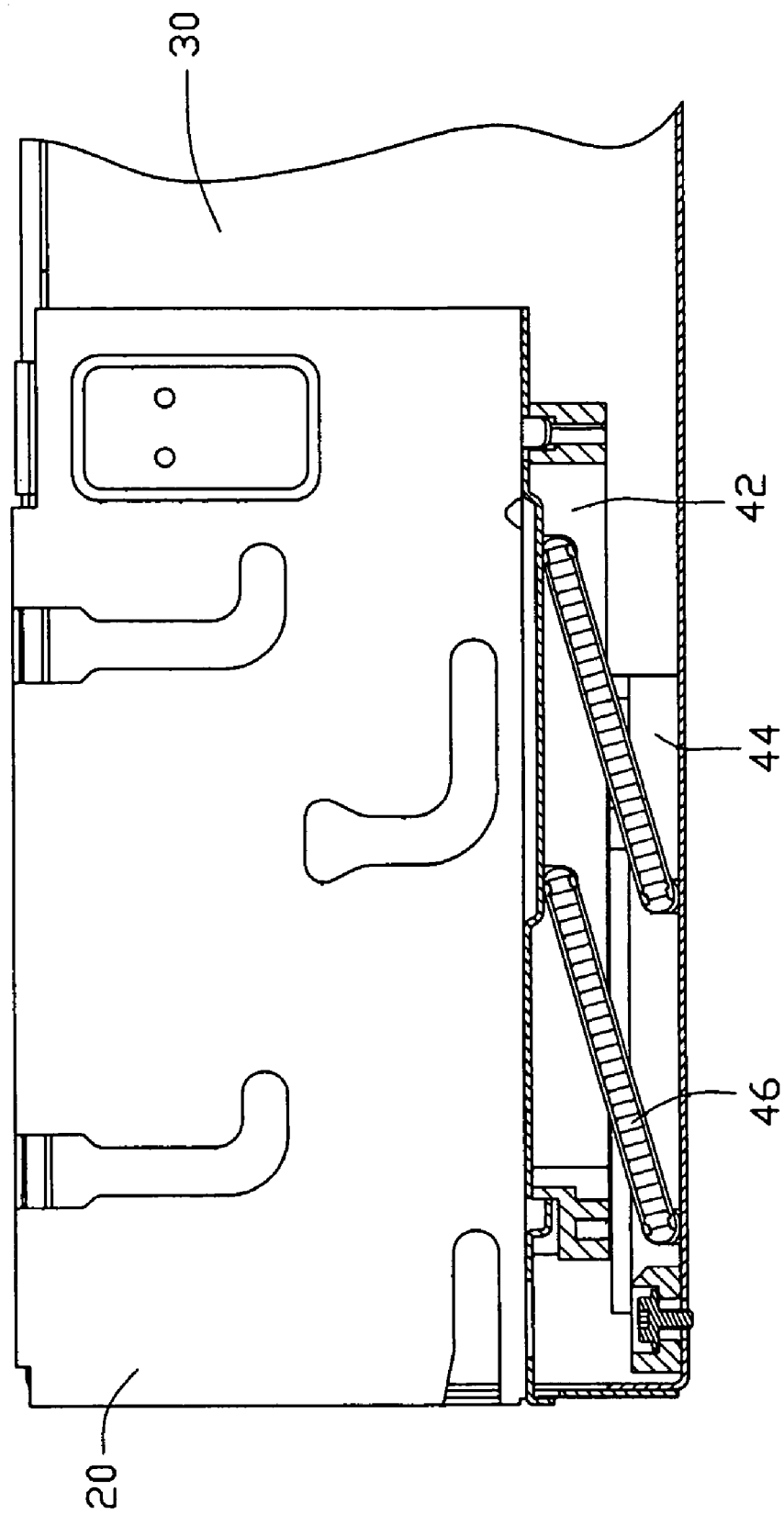
FIG. 4 is a cross-sectional view taken along line IV-IV of FIG. 3.
Figure 5:
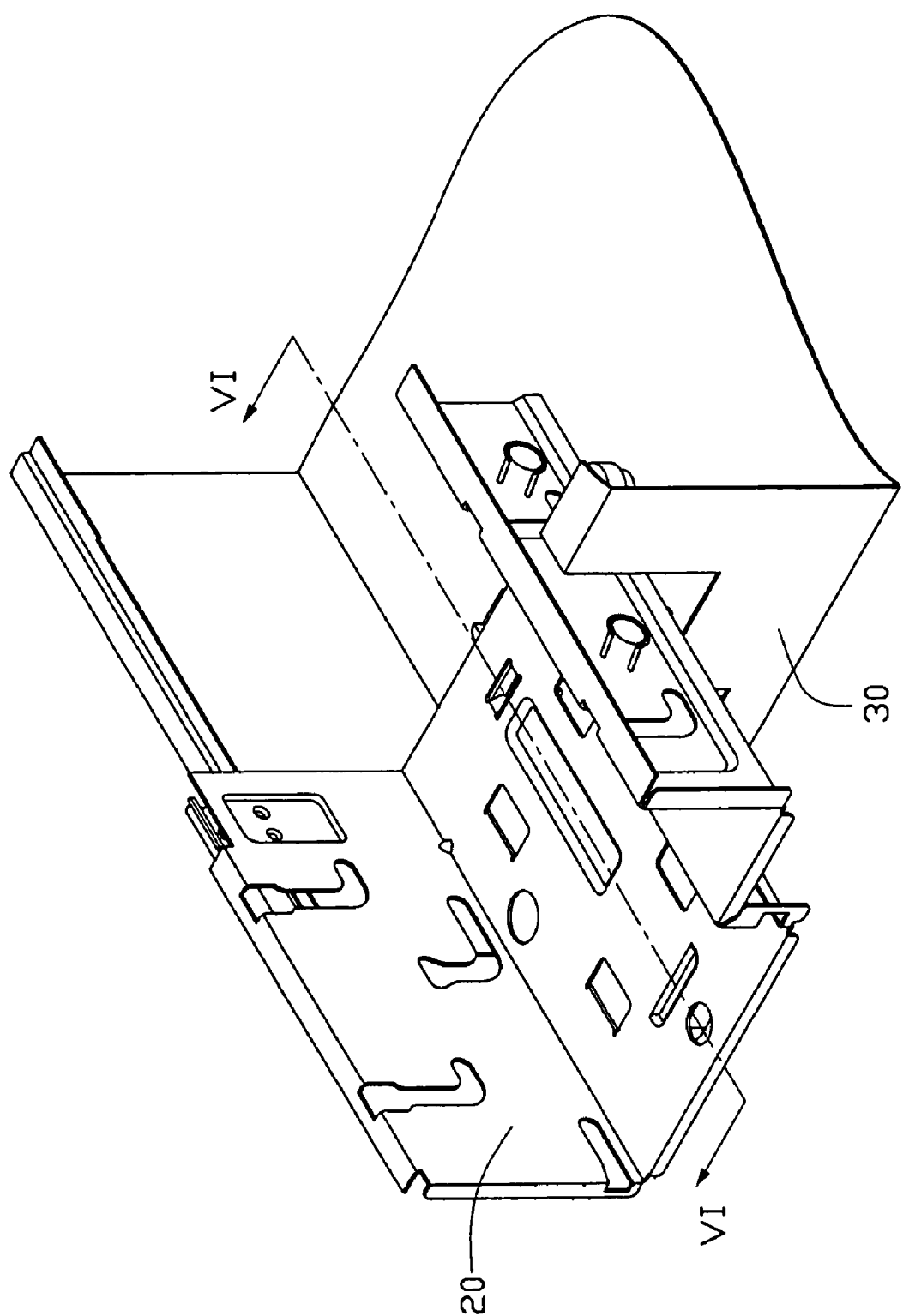
FIG. 5 is similar to FIG. 3, showing the drive bracket in a second orientation.
Figure 6:
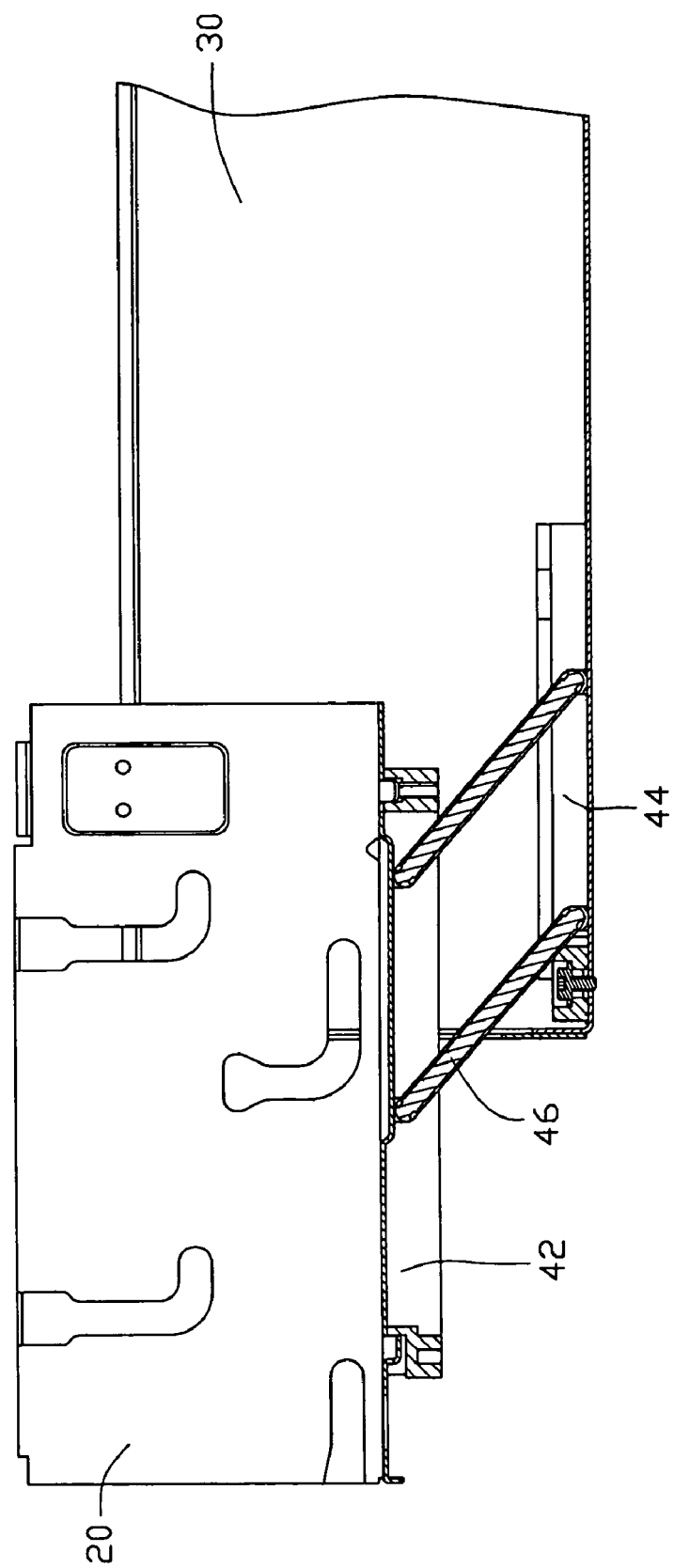
FIG. 6 is a cross-sectional view taken along line VI-VI of FIG. 5.

Referring also to FIG. 2, the drive bracket 20 is mounted in the computer cage 30 via the entrance 362 thereof. The drive bracket 20 comprises a stepped base plate 22 corresponding the entrance 362 of the computer cage 30, a first side plate 24 extending perpendicularly from one side edge of the base plate 22, a second side plate 26 parallel to the first side plate 24. A pair of second flanges 240, 260 extends outwardly from respective top edges of the first and second side plate 24, 26, corresponding to the supporting tab 360 and the first flange 340 of the computer cage 30. Two pair of spaced hooks 222 extends downwardly and oppositely from a bottom surface of the base plate 22 and defines a longwise slideway therebetween. A protrusion 226 and a tip 224 extend outwardly at opposite ends of the slideway.

The displacing assembly 40 comprises a first fixing member 42 slidably attached to the base plate 22 of the drive bracket 20, a second fixing member 44 securely attached on the bottom wall 32 of the computer cage 30, and a connecting member 46 movably combining the first fixing member 42 and the second fixing member 44 together.

The first fixing member 42 has an oblong configuration. A pair of wings 422 extends outwardly from longwise edges of the first fixing member 42 respectively, for sliding in the slideway defined by the hooks 222 of the drive bracket 20. A longwise recess 425 is defined in a middle of the first fixing member 42. Two pairs of first slots 424 are defined in an upper portion of the first fixing member 42 along the recess 425. The first slot 424 has a semicircular profile. A cutout 426, and a dent 420 are separately defined in the first fixing member 42 adjacent two opposite ends of the recess 425, corresponding to the protrusion 226 and the tip 224 of the drive bracket 20.

The second fixing member 44 comprises a beam 441, and a pair of coplanar arms 443 extending spacedly and perpendicularly from opposite ends of the beam 441. Two pairs of second slots 442 are defined in a bottom portion of the arms 443. The second slot 442 also has a semicircular profile. A through hole 440 is respectively defined in the beam 441 and arms 443, corresponding to fixing holes 320 of the computer cage 30.

Each connecting member 46 comprises a first post 462, and a second post 464 parallel to the first post 462. The first post 462 and the second post 464 are separately disposed at opposite sides thereof the connecting member 46. The first post 462 and the second post 464 each have a round profile, corresponding to the first slot 424 of the first fixing member 42 and the second slot 426 of the second fixing member 46.

Referring also to FIGS. 3-6, in assembly of the retaining device, the displacing assembly 40 is assembled first, the first posts 462 of the connecting member 46 are extended through the recess 425 and pivotally engage in the first slots 424 of the first fixing member 42. The second posts 464 of the connecting member 46 pivotally engage in the second slots 442 of the second fixing member 44. A plurality of fasteners 50 is extended through the through holes 440 of the second fixing member 44 and engages in the fixing holes 320 of the computer cage 30. Thus the second fixing member 44 is fixed to the bottom wall 32 of the computer cage 30. The wings 422 of the first fixing member 42 are slid in the slideway defined by the hooks 222 of the drive bracket 20. The first fixing member 42 is securely attached to the base plate 22 of drive bracket 20, when the protrusion 226 and the tip 224 of the drive bracket 20 engaging in corresponding cutout 426 and corresponding tip 424 of the first fixing member 42. Thereby the drive bracket 20 is mounted in the computer cage 30 via the displacing assembly 40. The connecting members 46 associating the first fixing member 42 and the second fixing member 44 form a four-bar-linkage structure. The second flanges 240, 260 of the drive bracket 20 seat on the supporting tab 360 and the first flange 340 of the computer cage 30. A space is defined between the base plate 22 of the drive bracket 20 and the bottom wall 32 of the computer cage 30, for installing other needed components in the computer cage 30.

In usage, when users need to repair/maintain the storage device or operating other components installed in the computer cage 30, the drive bracket 20 is drawn outward along the entrance 362. Accordingly, the first posts 462 move outwardly together with the first fixing member 42 fixed on the computer cage 30. At the same time, the connecting member 46 is rotated outward about the second post 464 thereof. In the same way, when users complete predetermined operations, the drive bracket 20 is pushed inwardly along the entrance 362 to its original orientation. Accordingly, the first posts 462 of the connecting member 46 move inward together with the first fixing member 42 and the connecting member 46 is rotated inward about the second post 464. This is convenient and safety during the operation the storage device and other components installed in the computer cage 30.

Figure 7:
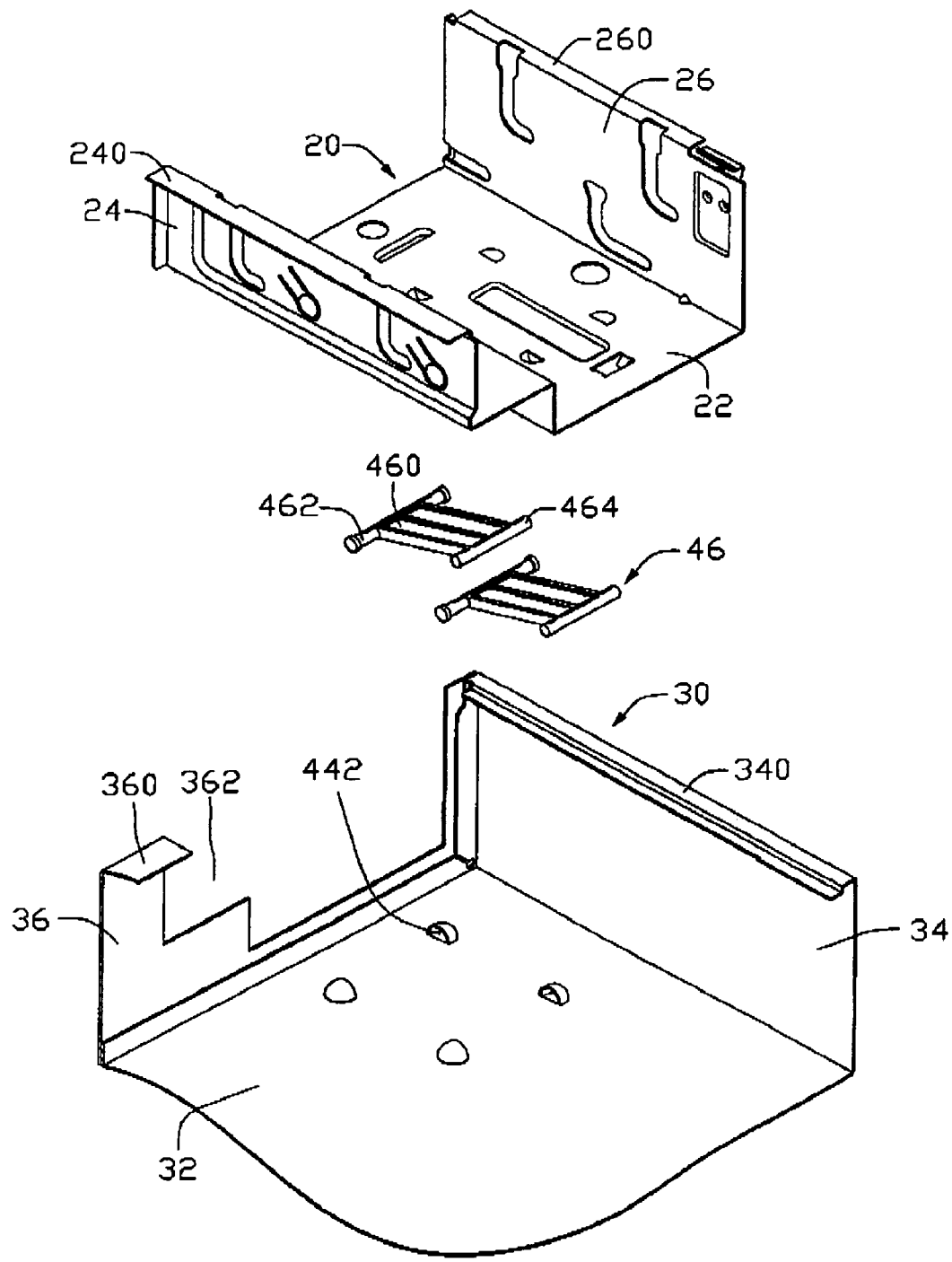
FIG. 7 is an exploded, isometric view of a retaining device in accordance with an alternative embodiment of the present invention, the retaining device comprising a computer cage, a drive bracket, and a displacing assembly.
Figure 8:
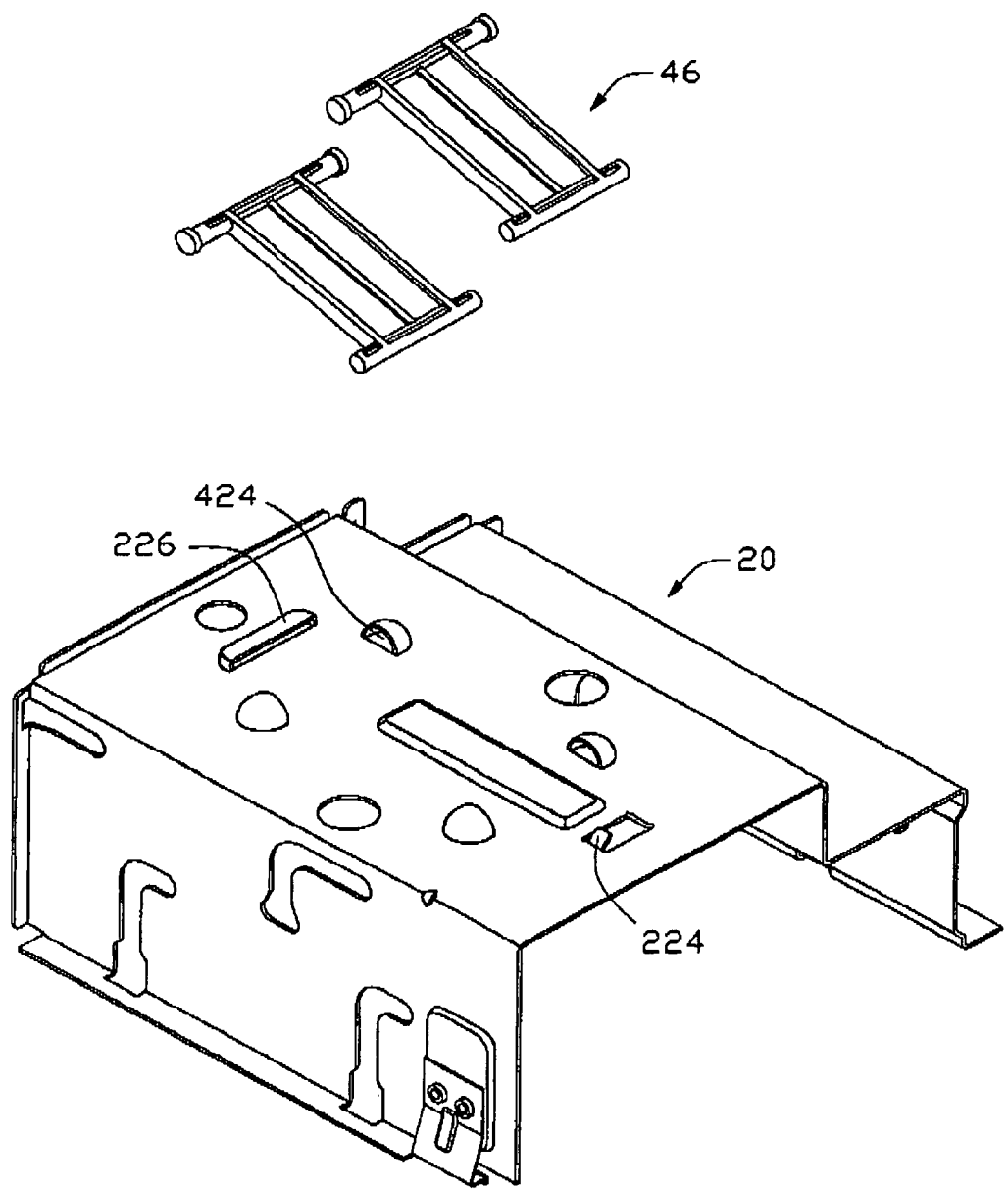
FIG. 8 is an enlarged view of the drive bracket, and a displacing assembly shown in FIG. 7, but showing these components inverted from FIG. 7.

Referring to FIGS. 7-8, in an alternative embodiment, the first and second fixing member 42, 44 can be omitted, the first slot 424 can be formed on the base plate 22 of the drive bracket 20, and the second slot 442 can be formed on the bottom wall 32 of the computer cage 30.

While the present invention has been illustrated by the description of the preferred embodiments thereof, and while the preferred embodiments have been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A retaining device comprising:
   a computer cage comprising a bottom wall;
   a drive bracket comprising a base plate;
   and a displacing assembly movably attaching the drive bracket to the computer cage, the displacing assembly comprising a first fixing member fixed on the base plate of the drive bracket, a second fixing member fixed on the bottom wall of the computer cage, and at least one connecting member pivotally engaging in the first fixing member and the second fixing member, for driving the drive bracket to move out of the computer cage with the at least one connecting member, the drive bracket moving horizontally parallel to the bottom wall of the computer cage;
   wherein the base plate of the drive bracket comprises at least one pair of hooks extending outwardly therefrom, said hooks define a slideway therebetween, the first fixing member comprises a pair of wings extending outwardly, sliding in the slideway.

2. The retaining device as claimed in claim 1, wherein the base plate further comprises a protrusion, and a tip extending therefrom, the first fixing member comprises a cutout, and a dent, for engagingly receiving corresponding protrusion and the tip.

3. The retaining device as claimed in claim 1, wherein the at least one connecting member comprises a pair of posts, the first fixing member and the second fixing member each defines a pair of slots, for pivotally receiving the posts therein.

4. The retaining device as claimed in claim 3, wherein said slots each have a semicircular profile.

5. The retaining device as claimed in claim 1, wherein the second fixing member comprises a beam, and a pair of arms extending spacedly from the beam.

6. The retaining device as claimed in claim 5, wherein the arms define a plurality of slots therein, for pivotally receiving posts of one end of the connecting member.

7. The retaining device as claimed in claim 5, wherein a plurality of through holes is defined in the beam and the arms of the second fixing member, the bottom wall of the computer cage defines plurality of fixing holes corresponding to the through holes.

8. The retaining device as claimed in claim 1, wherein the drive bracket comprises a pair of side plates extending upwardly from opposite edges of the base plate.

9. The retaining device as claimed in claim 8, wherein the computer cage comprises a front wall, and a sidewall extending perpendicularly from the bottom wall.

10. The retaining device as claimed in claim 9, wherein a supporting tab and a first flange respectively extend from the corresponding front wall and sidewall, a pair of second flanges extends from the side plates of the drive bracket, corresponding to the supporting tab and the first flange.

11. The retaining device as claimed in claim 9, wherein the front wall defines an entrance, corresponding to a configuration of the drive bracket.

12. A retaining device comprising:
a computer cage;
a drive bracket; and
a displacing assembly comprising at least one connecting member, said connecting members each comprising a first post, and a second post spaced and parallel to the first post, the first post having two ends both pivotally engaging with the drive bracket and the second post having two ends both pivotally engaging with the computer cage;
wherein the connecting members pivot about the second post in a first direction such that it drives the drive bracket into the computer cage, and in a second direction such that it drives the drive bracket out of the computer cage.

13. The retaining device as claimed in claim 12, wherein the computer cage comprises a front wall, and a sidewall extending perpendicularly from the bottom wall.

14. The retaining device as claimed in claim 13, wherein the drive bracket comprises a base plate, and a pair of side plate extending upwardly from opposite edges of the base plate.

15. The retaining device as claimed in claim 14, wherein a supporting tab and a first flange extend from corresponding front wall and sidewall, a pair of second flanges extends from the side plates of the drive bracket, corresponding to the supporting tab and the first flange.

16. A retaining device comprising:
a computer cage comprising a wall defining an opening;
a drive bracket; and
a displacing assembly pivotally connecting the drive bracket to the computer cage, the displacing assembly comprising a four-bar-linkage structure which has front and rear connecting members connected by a bottom plate of the drive bracket at upper ends thereof, lower ends of the front and rear connecting members being connected to a bottom wall of the computer cage;
wherein the drive bracket is moved substantially horizontally rearward or forward substantially along a direction parallel to the bottom wall of the computer cage, via the four-bar-linkage structure.

17. The retaining device as claimed in claim 16, wherein each of the rear and front connecting members comprising an upper horizontal post and a lower horizontal post for being pivotally connected to the bottom plate of the drive bracket and the bottom wall of the computer cage, respectively.

18. The retaining device as claimed in claim 17, wherein a first fixing member is attached to the bottom plate of the drive bracket defining slots to pivotally receive the upper horizontal posts, a second fixing member is attached to the bottom wall of the computer cage defining slots to pivotally receive the lower horizontal posts.

* * * * *